United States Patent
Baentsch et al.

(10) Patent No.: US 7,861,114 B2
(45) Date of Patent: Dec. 28, 2010

(54) SYSTEM AND METHOD FOR RECOVERY OF MEMORY TRANSACTIONS

(75) Inventors: Michael Baentsch, Gross (CH); Peter Buhler, Horgen (CH); Frank Höring, Zurich (CH); Thorsten Kramp, Kilchberg (CH); Thomas Weigold, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 11/962,718

(22) Filed: Dec. 21, 2007

(65) Prior Publication Data

US 2008/0168307 A1 Jul. 10, 2008

(30) Foreign Application Priority Data

Dec. 22, 2006 (EP) ................... 06127040

(51) Int. Cl.
*G06F 11/00* (2006.01)
(52) U.S. Cl. .................. 714/16; 714/15; 707/202
(58) Field of Classification Search .............. 714/16
See application file for complete search history.

(56) References Cited

U.S. PATENT DOCUMENTS

| | | | | |
|---|---|---|---|---|
| 4,922,456 A | * | 5/1990 | Naddor et al. | 365/185.24 |
| 5,869,823 A | * | 2/1999 | Bublitz et al. | 235/380 |
| 6,068,192 A | * | 5/2000 | McCabe et al. | 235/487 |
| 6,070,795 A | * | 6/2000 | Feiken | 235/380 |
| 6,272,607 B1 | * | 8/2001 | Baentsch et al. | 711/162 |
| 6,535,997 B1 | * | 3/2003 | Janson et al. | 714/15 |
| 7,065,538 B2 | * | 6/2006 | Aronoff et al. | 707/202 |
| 7,461,103 B2 | * | 12/2008 | Aronoff et al. | 707/204 |
| 2002/0049776 A1 | * | 4/2002 | Aronoff et al. | 707/200 |
| 2002/0116404 A1 | * | 8/2002 | Cha et al. | 707/202 |
| 2006/0212493 A1 | * | 9/2006 | Aronoff et al. | 707/202 |

FOREIGN PATENT DOCUMENTS

DE 10141926 A1 5/2003

OTHER PUBLICATIONS

Oestreicher, "Transactions in Java Card", ACSAC 99 Proceedings, pp. 291-298, Dec. 6, 1999.
Donsez, "Recoverable Persistent Memory for Smartcard", Lecture Notes in Computer Science, Springer Verlag, Berlin, vol. 1820, pp. 134-141, Jan. 1, 2000.
Min-Sik Jin, et al, "A Study on Fast JCVM with New Transaction Mechanism and Caching-Buffer Based on Java Card Objects with a High Locality" LNCS, Springer Verlage, Berlin, vol. 3823, pp. 91-100, Jan. 1, 2005.

* cited by examiner

*Primary Examiner*—Scott T Baderman
*Assistant Examiner*—Kamini Patel
(74) *Attorney, Agent, or Firm*—Kenneth R. Corsello; William Stock; Anne Vachon Dougherty

(57) ABSTRACT

A method for transactional writing of data into a persistent memory comprising memory cells includes a transactional writing step and a transaction recovery step. The transactional writing step comprises one or more memory cell writing steps comprising the sub-steps of writing in a transaction buffer as transaction buffer entry the current data value and the corresponding address of the respective memory cell, writing a first valid marker for the memory cell in the transaction buffer, and writing a new data value to the memory cell. The transaction recovery step is performed in case of an abortion of the transactional writing step for restoring the current data values of the aborted transaction in the persistent memory, the transaction recovery step comprising the sub-step of writing a transaction recovery marker to the transaction buffer indicating the start of the transaction recovery.

15 Claims, 6 Drawing Sheets

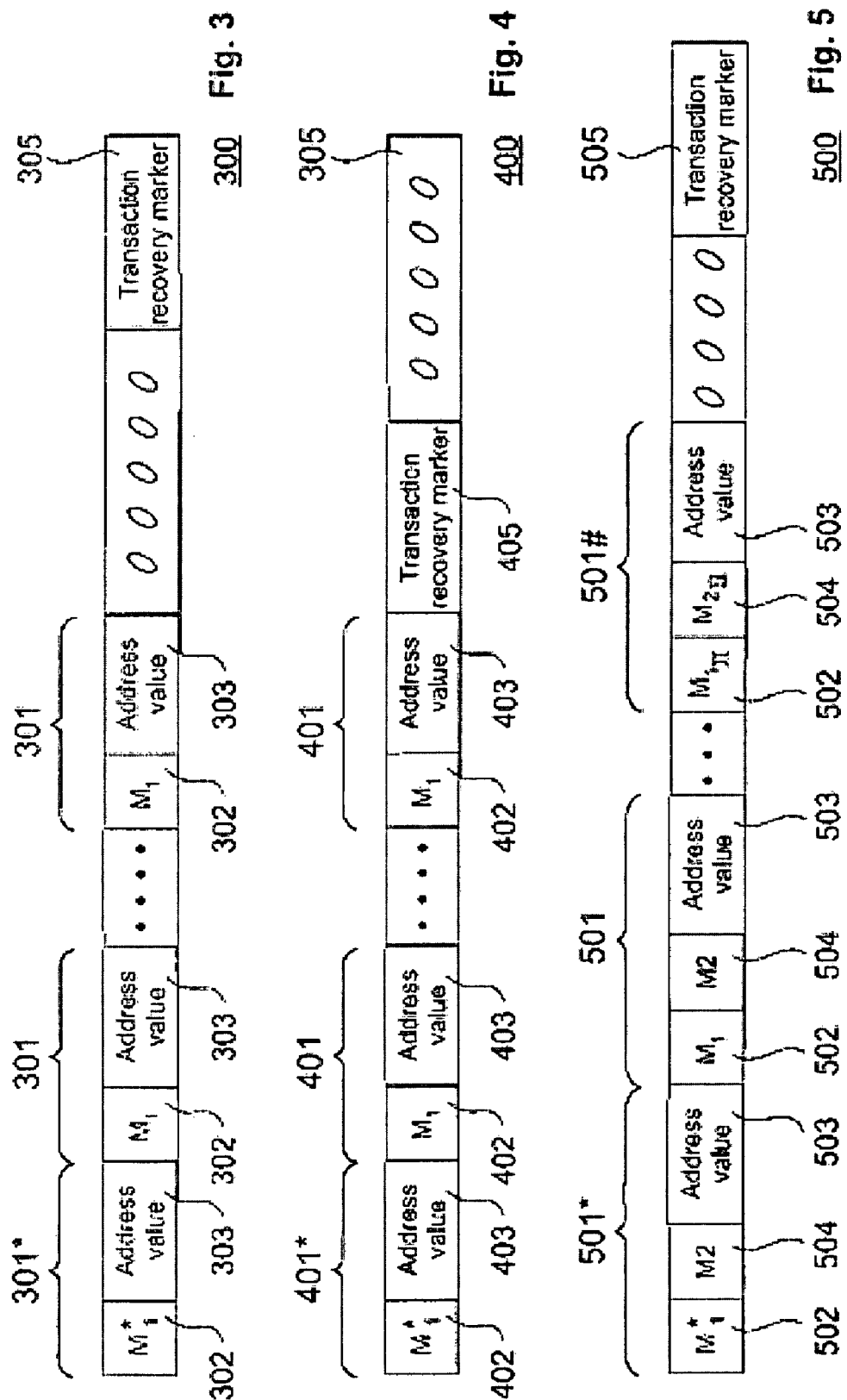

SYSTEM AND METHOD FOR RECOVERY OF MEMORY TRANSACTIONS

TECHNICAL FIELD

The present invention is related to a method for transactional writing of data into a persistent memory. The invention is further related to a corresponding memory system and a corresponding computer program.

BACKGROUND OF THE INVENTION

In environments where the resources computing time, communication bandwidth and memory are scarce, and where in addition, writing to persistent memory is much more expensive than writing to temporary memory, and where finally no assumptions about the integrity of the communications infrastructure can be made, new problems appear. The initial setting where these assumptions hold true, are smartcards that are to be updated after they have been issued to the customer.

A transition from one consistent memory system state to another may involve updates of several memory cells of persistent memory. These updates should be performed atomically, that means either all memory cells are updated or none of them. The atomicity of several memory updates is supported by the so called "transaction model" in which the system can designate the beginning of an atomic set of updates by issuing the begin-of-transaction command. This command may be given explicitly or even implicitly, i.e. be contained in the atomic set command itself. For instance primitive commands, like the data types "byte" and "short" have to be atomically updated and their mere appearance may already serve as begin-of-transaction command. After this point, each persistent memory cell is updated only conditionally by a transaction support system. That means that a memory cell appears to be updated and reading that memory cell returns its latest conditional value, but the update is not yet committed, i.e. guaranteed to remain as such visible in a subsequent start of the system. To commit all performed updates, the transaction-commit command is used. When this operation returns, all updates are guaranteed to be written to the persistent memory. If power is lost or some other system failure occurs prior to the completion of the transaction-commit operation, all conditional updates are discarded.

The implementation of the transaction model is generally based on maintaining a transaction buffer, part of which is in the persistent memory. There are two different modes of operation of the transaction support system. The one is to maintain in the transaction buffer information allowing restoration of the original state of the memory cells updated in a transaction. Before updating a memory cell in a transaction for the first time, the transaction support system stores in the transaction buffer the address of the memory cell and the previous data value of that memory cell. This information allows to roll-back to that old value in case of failure. If power is lost during a transaction, the data stored in the transaction buffer is used to recreate the old system state when power supply is established again.

An alternative approach is to write to the transaction buffer the conditional values of updated memory cells and their address/location instead of the old values. The memory cells themselves keep their old values. When a value is read, the transaction support system first inspects the transaction buffer; if a conditional value of the selected memory cell is in the transaction buffer, this value is returned. If this technique is used, no action is required in case of failure since the persistent system memory is unchanged before the transactions commits. The transaction-commit operation writes the values stored in the transaction buffer to their destinations.

Memory systems such as smart cards may be equipped with different types of persistent read/write memory, some of which (such as EEPROM) exhibit the behavior of so-called "weak cells". These weak cells are created when, during writing the memory cells, the smart card is removed from the smart card reader and therefore cannot fully complete the write operation before being cut off from its power supply. In the following, this is called a "weak write". After reboot, the weak memory cell then may not only return any value but even different values at different times, e.g., if read more than once. This may seriously harm the functionality of the smart card.

In a resource-constrained environment, such as a smartcard, the reliability and lifetime of the transaction buffer is an important parameter. Especially here, the goal of the transaction support system is to make most effective use of the transaction buffer thus allowing transactions performing higher number of updates to be executed within one transaction. Writing persistent memory is time-consuming compared to reading and influences the lifetime of the persistent memory. Another goal is hence to reduce the number of expensive write-operations to persistent storage needed for transaction support.

It is an object of the invention to provide improved solutions for transactional writing of data values into persistent memories.

It is a further object of the invention to provide improved solutions for transactional writing of data values into persistent memories that can reduce the adverse effect of weak writes.

SUMMARY AND ADVANTAGES OF THE INVENTION

The present invention is directed to a method, a memory system and a computer program as defined in independent claims. Further embodiments of the invention are provided in the appended dependent claims.

According to a first aspect of the invention there is provided a method for transactional writing of data into a persistent memory comprising memory cells, the method comprising a transactional writing step and a transaction recovery step, the transactional writing step comprising one or more memory cell writing steps, the memory cell writing steps comprising the sub-steps of
writing in a transaction buffer as transaction buffer entry the current data value and the corresponding address of the respective memory cell,
writing a first valid marker for the memory cell in the transaction buffer,
writing a new data value to the memory cell;
the transaction recovery step being performed in case of an abortion of the transactional writing step and being provided for restoring the current data values of the aborted transaction in the persistent memory, the transaction recovery step comprising the sub-step of:
writing a transaction recovery marker to the transaction buffer indicating the start of the transaction recovery.

The provision of a transaction recovery marker that indicates the start of a transaction recovery allows an evaluation whether a former transaction recovery was aborted. In other words, the transaction recovery marker indicates a pending transaction recovery. In other words, a memory system can check upon starting of a transaction recovery, if the respective transaction buffer comprises data from a former transaction recovery that could not be completed. This information about former and not completed transaction recoveries can be used to improve and enhance the reliability of the transaction recovery of memory systems. It is in particular useful to provide measures for avoiding memory system failures caused by weak writes.

According to an embodiment of the first aspect of the invention the transaction recovery marker is written behind the last valid entry of the transaction buffer and the transaction recovery step comprises the sub-step of
   restoring all transaction buffer entries up to the transaction recovery marker in the memory device.

According to this embodiment of the invention the transaction buffer comprises two functions. On the one hand it indicates a pending transaction recovery and on the other hand it indicates the last valid transaction buffer entry. This is very efficient in terms of reducing writing steps to the transaction buffer.

According to an embodiment of the first aspect of the invention a valid transaction recovery marker is defined by a predefined bit pattern.

This embodiment is in particular useful for memory cells for which after a weak write all possible combinations of data values for the respective weakly written memory cell arise with the same probability. In other words, it is in particular useful for memories cells for which it can be assumed that after a weak write all data values are equally distributed. As an example, if a byte is written, it can have $2^8=256$ different values and after a weak write each of these 256 combinations arise with the same probability of $1/256$. The probability that the transaction recovery marker is weakly written can be chosen by the size of the transaction recovery marker. The longer the transaction recovery marker, the lower the chance that the predefined bit pattern of the transaction recovery marker is by accident written by a weak write. If all possible bit combinations of a weak write are equally distributed, the chance that the predefined bit pattern stems from a weak write is $1/(2^n)$, wherein n denotes the number of bits of the transaction recovery marker. In other words, if actually a valid transaction recovery marker has been read, it can be considered with the above mentioned probability as not written weakly and therefore stable.

According to an embodiment of the first aspect of the invention a valid transaction recovery marker is defined by any bit pattern not equal to a predefined bit pattern.

This embodiment is in particular useful for memory cells which comprise the feature that after a weak write it is more likely to actually read the written value for some (short) period of time, but that after this period of time the contents of the affected memory cells may arbitrarily change their values. Preferably the predefined bit pattern according to this embodiment of the invention is a bit pattern of zeros. This means that a valid transaction recovery marker would be defined by any bit pattern that does not only comprise zeros.

According to an embodiment of the first aspect of the invention the first valid marker is defined by a predefined bit pattern.

According to an embodiment of the first aspect of the invention the transactional writing step comprises writing a second valid marker before writing the first valid marker.

Providing a first and a second valid marker provides redundancy and allows validity checking in pairs. By such validity checking in pairs the validity of one value can be derived from the validity of the other value. In other words, the first valid marker serves as validity indicator for the second valid marker. If the first valid marker is read as valid, it can be assumed that the previously written second valid marker was completely written and is not a weak-write.

As second valid marker extra or additional bits or bytes can be provided in a transaction buffer entry. As an alternative, bits or bytes that are present in a transaction buffer entry anyway can be used as second valid marker. As an example, a so called type-byte that indicates the length of a transaction buffer entry or the length of the data values of a transaction buffer entry respectively can be used as second valid marker. This saves memory space and writing operations.

According to an embodiment of the first aspect of the invention the second valid marker is defined by any bit pattern not equal to a predefined bit pattern.

This embodiment is in particular useful for useful for memory cells which comprise the feature that after a weak write it is more likely to actually read the written value for some (short) period of time, but that after this period of time the contents of the affected memory cells may arbitrarily change their values.

According to an embodiment of the first aspect of the invention the transaction recovery step comprises:
   a transaction buffer checking step for checking if the first valid marker of the first transaction buffer entry is valid; and, if the first valid marker of the first transaction buffer entry is valid,
   a transaction recovery marker checking step for checking if the transaction recovery marker is valid.

The first valid marker of the first transaction buffer entry indicates that the transaction buffer is in use, i.e. comprises transaction buffer entries. The transaction recovery marker indicates that the respective transaction buffer was involved in a former transaction recovery that was not completed.

Checking these two markers provides the memory system with the main status of the transaction buffer in an efficient and reliable way.

According to an embodiment of the first aspect of the invention the transaction recovery step further comprises a rewriting step for rewriting the first valid marker of the first transaction buffer entry, the rewriting step being performed after the transaction buffer checking step if the first valid marker of the first transaction buffer entry is valid.

This embodiment is in particular useful for useful for memory cells which comprise the feature that after a weak write it is more likely to actually read the written value for some (short) period of time, but that after this period of time the contents of the affected memory cells may arbitrarily change their values. It avoids failures in cases where a transaction recovery was performed before, but the erasure or invalidating of the first valid marker of the first transaction buffer entry was a weak write.

According to an embodiment of the first aspect of the invention the transaction recovery step further comprises:
   if the transaction recovery marker is valid, performing a main transaction recovery step by means of recovering all transaction buffer entries whose second valid marker is valid,
   if the transaction recovery marker is invalid, further evaluating whether the first valid marker of the last transaction buffer entry is valid,
   if the first valid marker of the last transaction buffer entry is valid,
      writing the transaction recovery marker and performing the main transaction recovery step;
   if the first valid marker of the last transaction buffer entry is invalid, writing the corresponding first and/or second valid marker of this transaction buffer entry as invalid, writing the transaction recovery marker and performing the main transaction recovery step.

This embodiment is in particular useful for memory cells which comprise the feature that after a weak write it is more likely to actually read the written value for some (short) period of time, but that after this period of time the contents of the affected memory cells may arbitrarily change their values.

During the main transaction recovery step the first valid markers can be ignored. This is based on the fact that if the transaction recovery marker is evaluated as valid, one can assume that all validly read second valid markers are not weakly written. This again is derived from the fact that the transaction recovery marker is only written if the first valid marker of the last transaction buffer entry is read as valid. And if the first valid marker of the last transaction buffer entry is read as valid, one can assume that the second valid markers have been written completely.

According to an embodiment of the first aspect of the invention the following steps are performed for completion of the transaction recovery step:

invalidating the first valid marker of the first transaction buffer, invalidating the transaction recovery marker.

This indicates to the memory system that there is no aborted transaction recovery pending.

According to an embodiment of the first aspect of the invention the method comprises the following steps if the first valid marker of the first transaction buffer entry is invalid:

checking if the transaction recovery marker is valid, and, if the transaction recovery marker is invalid, performing the steps of invalidating the first valid marker of the first transaction buffer, invalidating the transaction recovery marker.

This completes a transaction recovery that was aborted while trying to complete the transaction recovery.

The above presented methods further provide the advantage that any additional processing required to deal with weak writes is done only during transaction recovery, i.e. when a transaction has been aborted and any memory cells modified have to be restored. This can be reasonably assumed as being the rare case in comparison to the number of transactions that are successfully completed in a real-world scenario. Given the long time a typical write to a persistent memory takes, the presented methods thus optimizes the runtime performance of memory systems such as smart cards for the normal case.

The above presented methods may reduce or avoid in particular memory system failures that may be caused by weak writes of valid markers.

According to a second aspect of the invention there is provided a memory system comprising a persistent memory and a persistent transaction buffer, wherein the memory system is provided for transactional writing of data values into the persistent memory, wherein the memory system is provided for performing a transactional writing step and a transaction recovery step, the transactional writing step comprising one or more memory cell writing steps, the memory cell writing steps comprising the sub-steps of writing in a transaction buffer as transaction buffer entry the current data value and the corresponding address of the respective memory cell, writing a first valid marker for the memory cell in the transaction buffer, writing a new data value to the memory cell, the transaction recovery step being performed in case of an abortion of the transactional writing step and being provided for restoring the current data values of the aborted transaction in the persistent memory, the transaction recovery step comprising the sub-step of writing a transaction recovery marker to the transaction buffer indicating the start of the transaction recovery.

According to an embodiment of the second aspect of the invention the memory system is a smart card.

According to a third aspect of the invention there is provided a computer program for transactional writing of data into a memory device, comprising instructions for carrying out the steps of the method according to the first aspect of the invention when said computer program is executed on a memory system.

Any of the device features may be applied to the method aspect of the invention and vice versa. Advantages of the device features apply to corresponding method features and vice versa.

DESCRIPTION OF THE DRAWINGS

Preferred embodiments of the invention are described in detail below, by way of example only, with reference to the following schematic drawings.

FIG. 3 shows a schematic illustration of a transaction buffer according to an embodiment of the present invention, FIG. 4 shows a schematic illustration of a transaction buffer according to another embodiment of the present invention, FIG. 5 shows a schematic illustration of a transaction buffer according to another embodiment of the present invention.

The drawings are provided for illustrative purpose only and do not necessarily represent practical examples of the present invention to scale. In the figures, same reference signs are used to denote the same or like parts.

FIG. 1 shows a schematic block diagram of a memory system 100 according to an embodiment of the invention. The memory system 100 can be e.g. a memory card, in particular a smart card. The memory system 100 comprises a central processing unit (CPU) 110 and a co-processing unit 120. The memory system 100 comprises an input/output device 130 for communication with external devices such as memory card readers/writers. The input/output device 130 may be a wired or a wireless interface. Furthermore, the memory system 100 comprises a persistent memory 150, a ROM 140, a RAM 145 and a persistent transaction buffer 160. The persistent memory 150 and the persistent transaction buffer 160 may be part of one persistent memory block 190. The central processing unit (CPU) 110, the co-processing unit 120, the input/output device 130, the ROM 140, the RAM 145 and the persistent memory block 190 comprising the persistent memory 150 and the transaction buffer 160 may communicate with each other via an internal bus system 170. The memory system 100 comprises a power interface 180 for receiving electrical power. This power interface 180 may be wireless or wired. The transaction buffer 160 is provided for intermediate storage of data values during a transactional writing of a transaction. This allows for recovering of the previous data values in case of an abortion of the transaction.

The persistent memory 150 may be e.g. an EEPROM and may exhibit the behaviour of so-called "weak memory cells". These weak memory cells may be created when, during writing the persistent memory 150, the memory system 100 is cut off from the power supply. For example, if the memory system 100 is a smart card, such cut off from the power supply may occur when the smart card is removed from the smart card reader during a transactional writing process. Hence the transactional writing cannot be fully completed. In the following this is denoted as a "weak write". After re-boot, the weak memory cell may not only return any data value, but even different data values at different times, e.g., if read more than once.

At the application level, transactions are the primary means for ensuring data consistency even if a memory system such as a smart card is cut off from its power supply at arbitrary points in time. A transaction basically ensures that a sequence of operations is—as far as the application is concerned—performed either completely or not at all. The effects of a weak cell are therefore especially hazardous during transactions and as such ask for specific mechanisms in the transaction system of any smart card operating system to be handled correctly.

Figure 1:
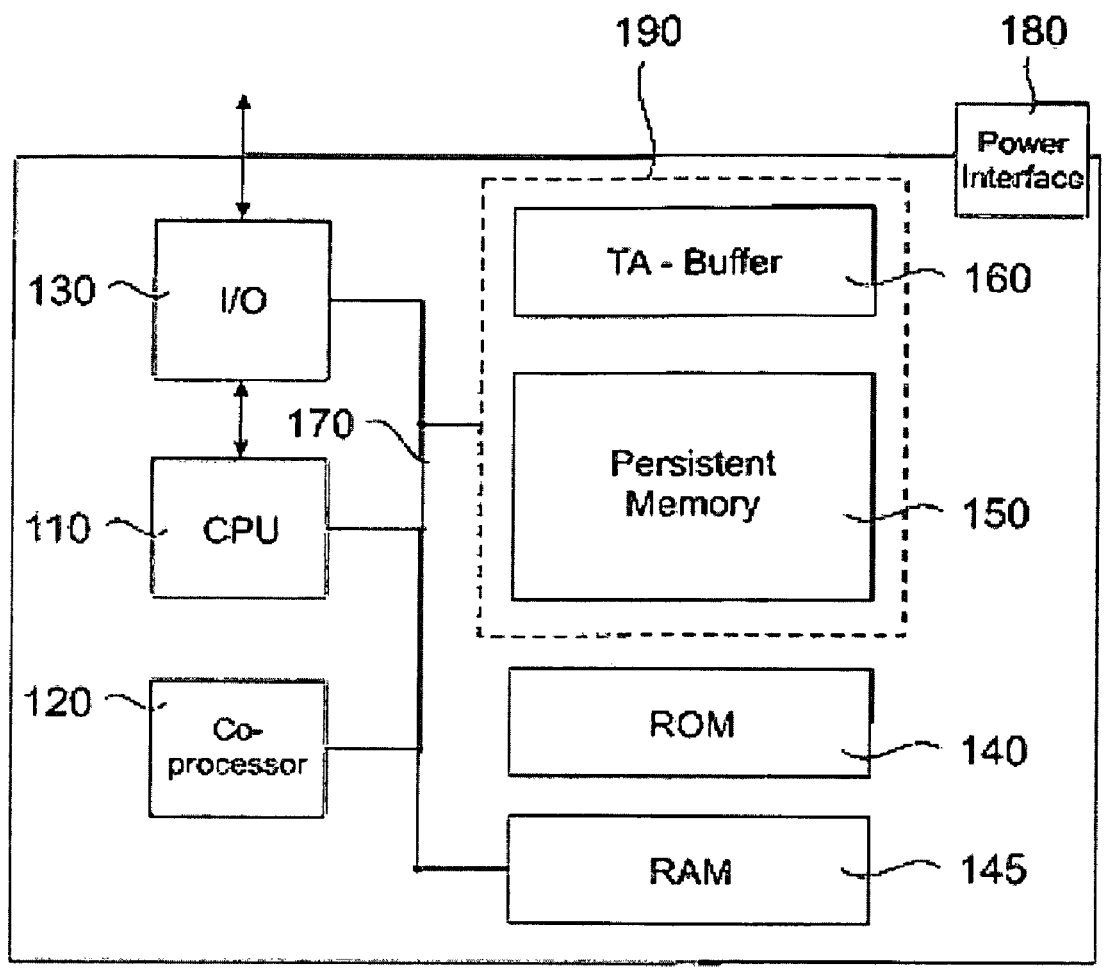
FIG. 1 shows a schematic block diagram of a memory card according to an embodiment of the present invention.
Figure 2:
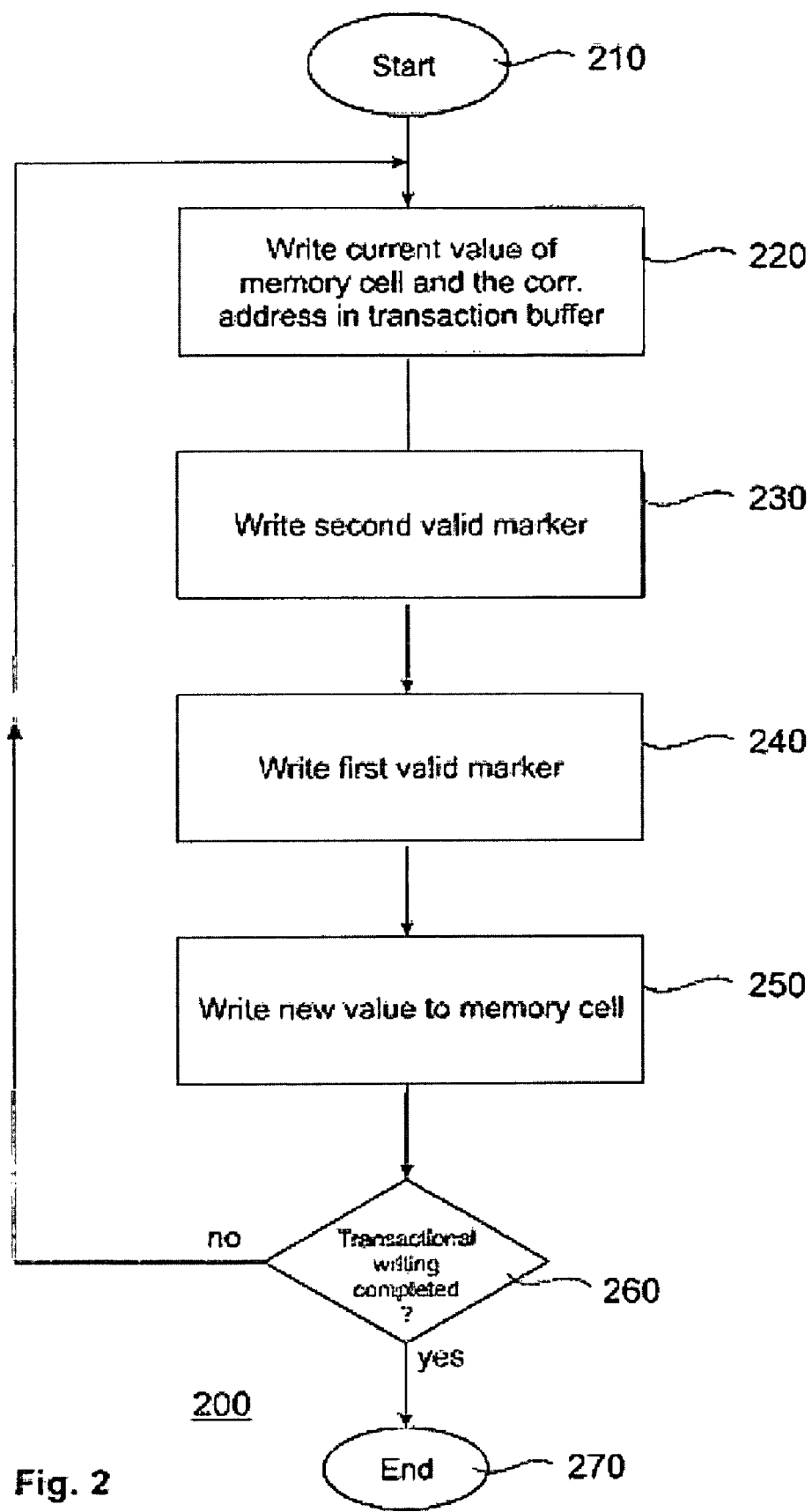
FIG. 2 shows a schematic illustration of a flow chart of a transactional writing step according to an embodiment of the present invention.

FIG. 2 shows a flow chart of a transactional writing step 200 for transactional writing of data values into a memory device. The memory device could be e.g. the persistent memory 150. In a starting step 210 the transactional writing step 200 is started. This means, the memory system 100 wants to write one or more new data values that are allocated to a transaction in the persistent memory 150. The transactional writing step 200 comprises one or more memory cell writing steps. Each of the memory cell writing steps comprises a sub-step 220, a sub-step 230, a sub-step 240 and a sub-step 250.

In the sub-step 220 the memory system 100 writes the current data value of the respective memory cell and the corresponding address as transaction buffer entry in the transaction buffer 160. In the sub-step 230 the memory system 100 writes a second valid marker for the transaction buffer entry in the transaction buffer 160. In the following sub-step 240 the memory system 100 writes a first valid marker for the transaction buffer entry in the transaction buffer 160. The sub-step 230 is optional and may be omitted for some embodiments of the invention. If the sub-step 230 is omitted, there is only one valid marker, namely the first valid marker, written in the transaction buffer 160. As an alternative, bits or bytes that are present in a transaction buffer entry anyway can be used as second valid marker. As an example, a so called type-byte that indicates the length of a transaction buffer entry or the length of the data values of a transaction buffer entry respectively can be used as second valid marker. In the following sub-step 250 the memory system 100 writes the new data value to the respective memory cell of the persistent memory 150.

In the sub-step 260 it is checked whether the transactional writing has been completed or if more memory cells that belong to the transaction of the transactional writing step 200 have to be written. If this is the case, another memory cell writing step is performed and accordingly the sub-steps 220-250 are repeated. If for all memory cells that belong to the pending transactional writing step 200 the sub-steps 220 to 250 have been performed and accordingly all memory cells involved in the transaction have been written with their new values, the transactional writing step 200 is ended in step 270.

Performing the transactional writing step 200 in the described way allows that a transactional writing step 220 can be aborted and that the persistent memory 150 can be set back to the state it had when the transactional writing step 200 started.

The transaction buffer 160 contains one transaction buffer entry for each persistent memory location, i.e. for each memory cell, modified during a transactional writing step 200. Each transaction buffer entry comprises an address/data value pair describing the data value to be recovered if a transaction aborts and a first and optionally a second valid marker for identifying valid transaction buffer entries in the transaction buffer 160.

If the transactional writing step 200 eventually commits (i.e., is logically complete at the application level) the transaction buffer 160 can be erased because the new data have been stored already persistently in the persistent memory 150. Otherwise, if during the transactional writing step 200 the transaction is aborted, a transaction recovery is done the very next time the memory system 100 is booted again. An abortion of the transactional writing step 200 may e.g. arise if during the transactional writing step 200 the memory system 100 is cut off from power supply. This scenario is in particular relevant if the power interface 180 of the memory system 100 is a wireless power interface. Such memory systems could be e.g. contact-less smart-card readers which are increasingly used for ticketing or identification applications because the smart card power is extracted from an electromagnetic field of highly variable strength.

FIG. 3 shows a block diagram of a transaction buffer 300 according to an exemplary embodiment of the invention. The transaction buffer 300 comprises transaction buffer entries 301. In general the transaction buffer 300 may comprise any number of transaction buffer entries which is indicated by the bolded points. Each of the transaction buffer entries 301 comprises a first valid marker $M_1$ denoted by the reference numeral 302. The first valid marker $M_1$ is preferably defined as valid by a predefined bit pattern. Furthermore, each of the transaction buffer entries 301 comprises data fields 303 comprising a data value and the corresponding address of the data value in the persistent memory 150. The first valid markers $M_1$ indicate that the corresponding data fields 303 comprise a valid data value and data address. After the last transaction buffer entry 301 the transaction buffer comprises not used, i.e. not written transaction buffer fields which are indicated by the zeros. At the end of the transaction buffer 300 there is arranged a transaction recovery marker 305. The transaction recovery marker 305 is provided for indicating the start of a transaction recovery. The transaction recovery marker 305 according to this embodiment of the invention is preferably defined as valid by a predefined bit pattern. Preferably the transaction recovery marker 305 is longer, i.e. comprises more bits or bytes than the first valid markers $M_1$. As the first valid marker of the first transaction buffer entry has a prominent position, it is denoted with $M_{1*}$ and the corresponding first transaction buffer entry with 301*.

FIG. 4 shows a block diagram of a transaction buffer 400 according to another exemplary embodiment of the invention. The transaction buffer 400 comprises transaction buffer entries 401. In general the transaction buffer 400 may comprise any number of transaction buffer entries which is indicated by the bolded points. Each of the transaction buffer entries 401 comprises a first valid marker $M_1$ denoted by the reference numeral 402. The first valid marker $M_1$ is preferably defined as valid by a predefined bit pattern. Furthermore, each of the transaction buffer entries 401 comprises data fields 403 comprising a data value and the corresponding address of the data value in the persistent memory 150. The first valid markers $M_1$ indicate that the corresponding data fields 403 comprise a valid data value and data address. After the last valid transaction buffer entry 401 the transaction buffer 400 comprises a transaction recovery marker 405. The transaction recovery marker 405 is provided for indicating the start of a transaction recovery. The transaction recovery marker 405 according to this embodiment of the invention is preferably defined as valid by a predefined bit pattern. After the transaction recovery marker 405 the transaction buffer 400 comprises not used, i.e. not written transaction buffer fields which are indicated by the zeros.

According to this embodiment of the invention the transaction recovery marker 405 has two functions. On the one hand, it indicates that a transaction recovery has been started. On the other hand it indicates the last valid transaction buffer entry 401. This avoids additional write operations to indicate the last valid transaction buffer entry 401.

As the first valid marker of the first transaction buffer entry has a prominent position, it is denoted with $M_{1*}$ and the corresponding first transaction buffer entry with 401*.

FIG. 5 shows a block diagram of a transaction buffer 500 according to another exemplary embodiment of the invention. The transaction buffer 500 comprises transaction buffer entries 501. In general the transaction buffer 500 may comprise any number of transaction buffer entries 501 which is indicated by the bolded points. Each of the transaction buffer entries 501 comprises a first valid marker $M_1$, denoted by the reference numeral 502, and a second valid marker $M_2$, denoted by the reference numeral 504. The first valid marker $M_1$ is preferably defined as valid by a predefined bit pattern. The second valid marker $M_2$ is preferably defined as valid by any bit pattern not equal to a predefined bit pattern. As an example, the second valid marker $M_2$ could be defined as valid by any bit pattern not equal to a bit pattern of only zeros. As second valid marker $M_2$ extra or additional bits or bytes can be provided in a transaction buffer entry 501. As an alternative, bits or bytes that are present in a transaction buffer entry 501 anyway can be used as second valid marker $M_2$. As an example, a so called type-byte that indicates the length of the data values of the transaction buffer entry 501 can be used as second valid marker $M_2$ if already present. Furthermore, each of the transaction buffer entries 501 comprises data fields 503 comprising a data value and the corresponding address of the data value in the persistent memory 150. The first valid markers $M_1$ and the second valid markers $M_2$ indicate that the corresponding data fields 502 comprise a valid data value and data address. Providing a combination of a first valid marker $M_1$ and a second valid marker $M_2$ offers the advantage of enhanced reliability with respect to the validity of the corresponding data fields 503. As described with reference to FIG. 2, the second valid marker $M_2$ is written before the valid marker $M_1$. This provides redundancy and the possibility of mutual checking. As an example, if the first valid marker $M_1$ is read as valid, the memory system 100 can be sure that at least the second valid marker $M_2$ was completely written and is hence not a weak write.

After the last transaction buffer entry 501 the transaction buffer comprises not used, i.e. not written transaction buffer fields which are indicated by the zeros. At the end of the transaction buffer 500 there is arranged a transaction recovery marker 505. The transaction recovery marker 505 is provided for indicating the start of a transaction recovery. The transaction recovery marker 505 according to this embodiment of the invention is preferably defined by any bit pattern not equal to a predefined bit pattern. As an example, the transaction recovery marker 505 could be defined as valid by any bit pattern not equal to a bit pattern of only zeros.

As the first valid marker of the first transaction buffer entry has a prominent position, it is denoted with $M_{1*}$ and the corresponding first transaction buffer entry with 501*.

As the first and the second valid marker of the last valid transaction buffer entry have a prominent position, they are denoted with $M_{1\#}$ and $M_{2\#}$ and the corresponding last valid transaction buffer entry with 501#.

Figure 6:
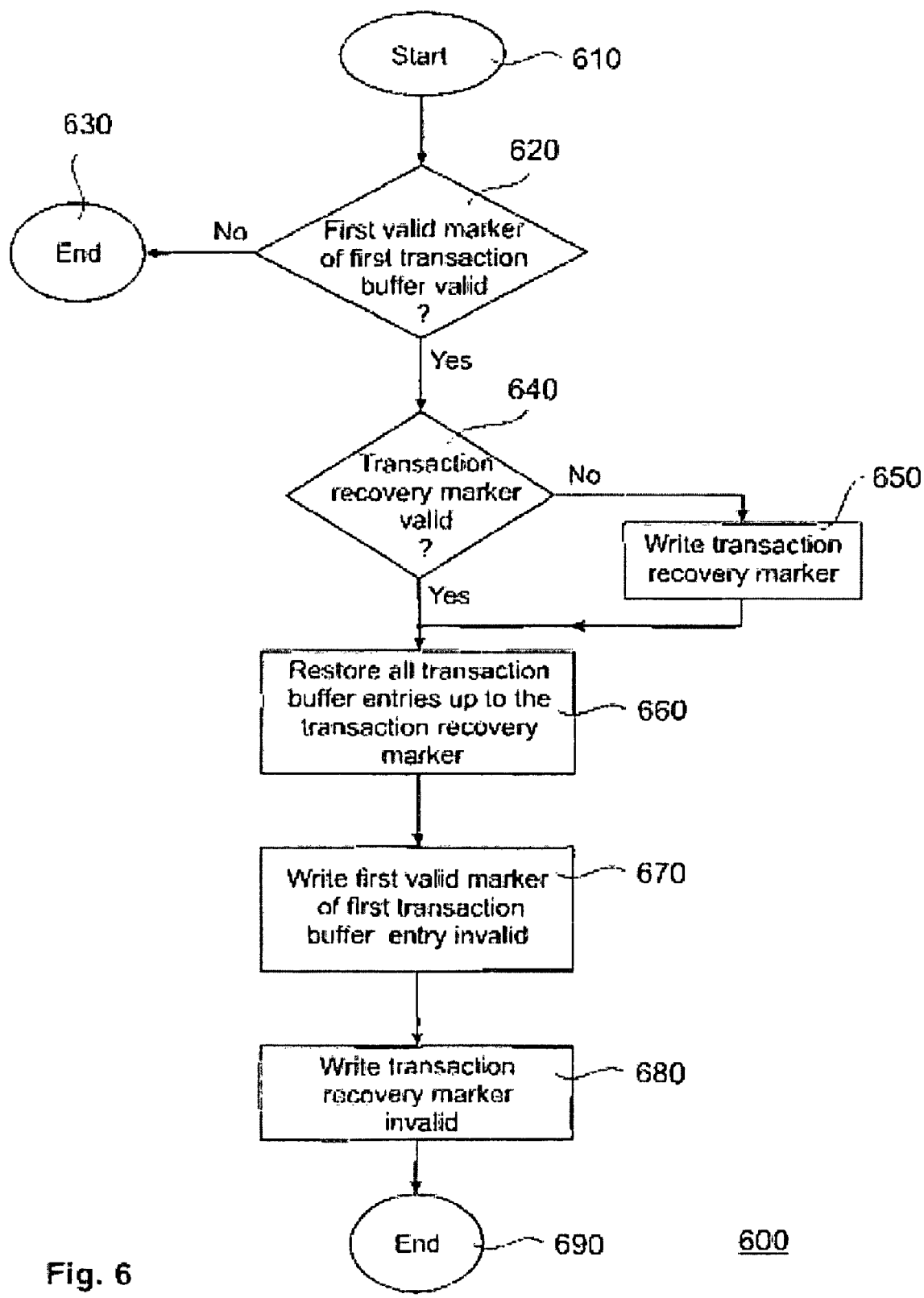
FIG. 6 shows a schematic illustration of a flow chart of a transaction recovery step according to an embodiment of the present invention.

FIG. 6 shows a flow chart of a transaction recovery step 600 according to an embodiment of the invention.

The transaction recovery step 600 as illustrated in FIG. 6 is in particular suited for persistent memories that exhibit the following properties: The data values after a weak write are equally distributed. This is even the case if a multi-byte area is written weakly. In other words, it is assumed that if a write operation is interrupted, i.e. could not be completed, the bit values involved in the write operation may be any combination with the same probability. As an example, if the write operation aims at writing a byte and this write operation is aborted, it is assumed that any of the 256 bit combinations of this byte arise with the same probability. Furthermore, it is assumed that the data value that is read after such a weak-write is stable, i.e., does not change anymore.

Furthermore, the transaction recovery step 600 is in particular suited for the transaction buffer 300 as described with reference to FIG. 3 and the transaction buffer 400 as described with reference to FIG. 4. In the following it is assumed that a transaction buffer 400 according to FIG. 4 is used in the transaction recovery step 600.

In a sub-step 610 the transaction recovery step 600 starts. This can e.g. be triggered by a re-boot after an interruption of the power supply of the memory system 100.

In a sub-step 620 it is evaluated whether the first valid marker $M_{1*}$ of the first transaction buffer entry 401* is valid. The sub-step 620 is also denoted as transaction buffer checking step. The first valid marker $M_{1*}$ of the first transaction buffer entry 401* serves two purposes. On the one hand, it indicates a valid data field 402 of the first transaction buffer entry 401*. On the other hand, it serves as well as an indicator that the transaction buffer 400 is in use, i.e. stores data values of a pending transaction.

If the first valid marker $M_{1*}$ of the first transaction buffer entry 401* is not valid, the transaction recovery step 600 ends already with sub-step 630. As described above, according to this embodiment of the invention it is assumed that once a data value has been written, the data value is stable and does not change anymore. Hence it is assumed that also the first valid marker of the first transaction buffer entry is correct and that one can rely on it.

In a following sub-step 640 it is checked whether the transaction recovery marker 405 is valid. The sub-step 640 is also denoted as transaction recovery marker checking step. If the transaction recovery marker 405 is not valid, it is assumed that this is true and that no pending transaction recovery was aborted before. In order to indicate the start of the pending transaction recovery step 600, the transaction recovery marker 405 is written in sub-step 650 behind the last valid transaction recovery entry 401. If in sub-step 640 it is found that the transaction buffer 400 comprises already a valid transaction recovery marker 450, the transaction recovery step 600 is continued with a sub-step 660. Furthermore, sub-step 660 is performed after sub-step 650. In sub-step 660 the memory system 100 restores all transaction buffer entries 401 up to the transaction recovery marker 405 from the transaction buffer 400 to the persistent memory 150. The first valid markers $M_1$ can be ignored during this restoring as it is assumed that the transaction buffer is and stays valid if it has been read as valid.

After sub-step 660 the transaction recovery step 600 is continued with a sub-step 670. In sub-step 670 the first valid marker $M_{1*}$ of the first transaction buffer entry 401* is written as invalid. This indicates that the transaction buffer 400 is not in use anymore. Then in sub-step 680 the transaction recovery marker 405 is written as invalid as well. In sub-step 690 the transaction recovery step 600 is ended.

The transaction recovery marker 405 according to this embodiment of the invention should preferably comprise more bits or bytes respectively than the page size of the memory system 100. As an example, for a typical EEPROM based smart card chip, a preferred size of the transaction recovery marker 405 could be e.g. 64 bytes.

The size of the transaction recovery marker 405 determines the probability that a weakly written transaction recovery marker 405 is read as valid. Under the assumption that after a weak write all possible bit combinations of the transaction recovery marker 405 that comprises n-bits are equally distributed, i.e. occur with the same probability, the chance is only $1/(2^n)$ that a transaction recovery marker 405 that has been written as valid stems from a weak-write. So if actually a valid transaction recovery marker 405 is read, it may be considered as not written weakly in the beginning and it may be assumed that it is stable and will not change its value.

Figure 7:
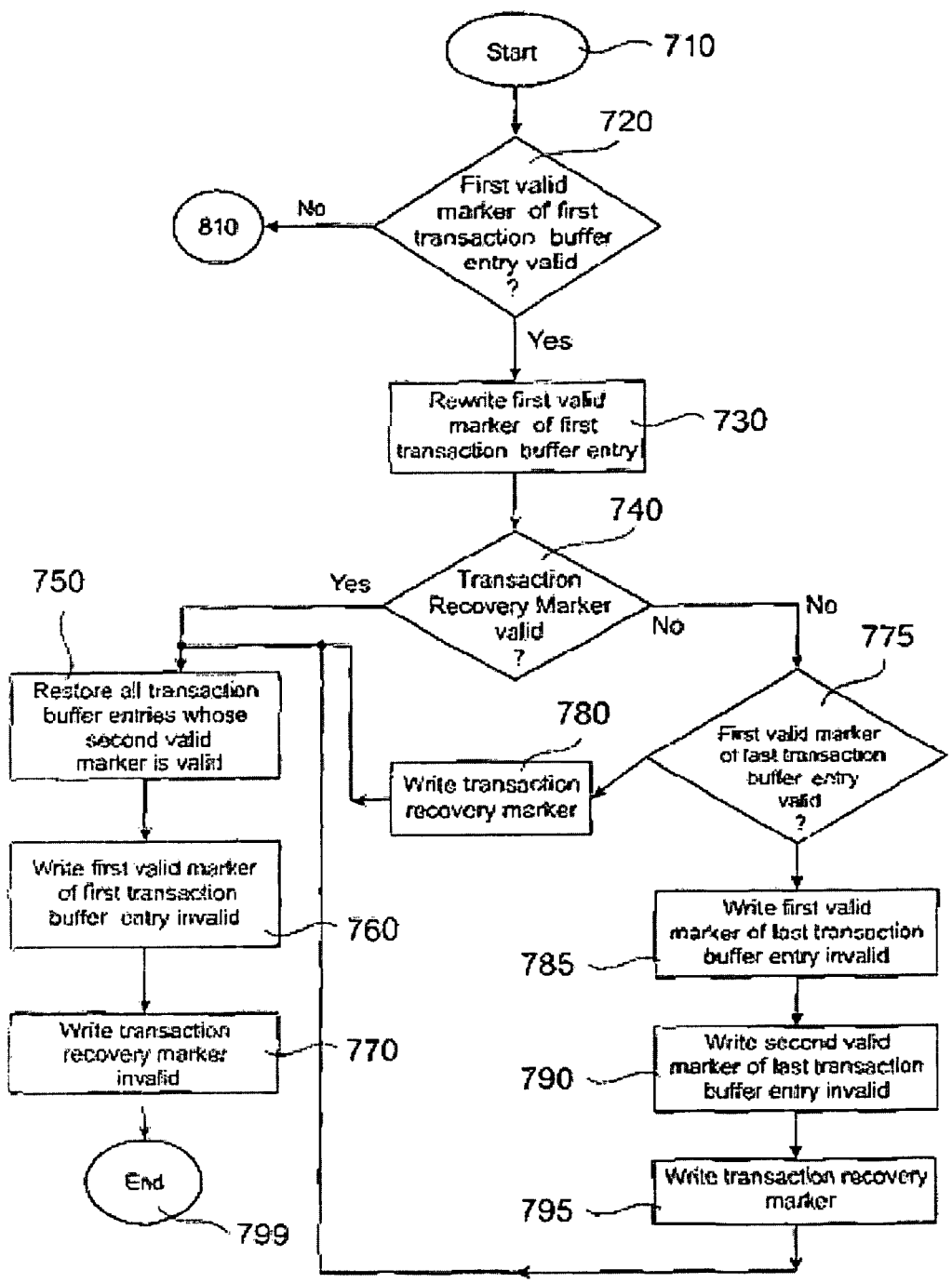
FIG. 7 shows a schematic illustration of a transaction recovery step according to another embodiment of the present invention.

FIG. 7 shows a flow chart of a transaction recovery step 700 according to another embodiment of the invention.

The transaction recovery step 700 as illustrated in FIG. 7 is in particular suited for persistent memories that exhibit the following properties: It can be assumed that after a weak write it is more likely to actually read the weakly written data value for a period of time, in particular a short period of time, before the contents of the affected memory cells may arbitrarily change their data values.

Taking this assumption into account, the transaction buffer 500 as described with reference to FIG. 5 is the preferred solution. According to this embodiment of the invention, the transaction recovery step 700 is not relying on a specific transaction recovery marker 505. According to this embodiment of the invention any transaction recovery marker 505 that is not equal to a predefined bit pattern is considered as a valid transaction recovery marker 550. Preferably the predefined bit pattern consists only of zeros. Then any transaction recovery marker 505≠0 is considered as a valid transaction recovery marker. In the latter example the transaction recovery marker 505 would be preferably written with a sequence of only "1". Then the probability that all these "1" change its value to zero is very low and the probability that the transaction recovery marker 505 is read correctly is very high. The desired probability can be chosen by means of the length, i.e. the number of bits or bytes of the transaction recovery marker 505.

In a sub-step 710 the transaction recovery step 700 starts. This can e.g. be triggered by a re-boot after an interruption of the power supply of the memory system 100.

In a sub-step 720 it is evaluated whether the first valid marker $M_{1*}$ of the first transaction buffer entry 501* is valid. This is also denoted as transaction buffer checking step. The first valid marker $M_{1*}$ of the first transaction buffer entry 501* serves two purposes. On the one hand, it indicates a valid data field 502 of the first transaction buffer entry 501* On the other hand, it serves as well as an indicator that the transaction buffer 500 is in use, i.e. stores data values of a pending transaction.

If the first valid marker $M_{1*}$ of the first transaction buffer entry 501* is not valid, the transaction recovery step 700 continues with a sub-step 810 which will be described below with reference to FIG. 8. If the first valid marker $M_{1*}$ of the first transaction buffer entry 501* is valid, the transaction recovery step 700 continues with a sub-step 730. In sub-step 730 the first valid marker $M_{1*}$ of the first transaction buffer entry 501* is re-written again. This strengthens the first valid marker $M_{1*}$ of the first transaction buffer entry 501* in case a transaction recovery had been performed before, but the erasing of the first valid marker $M_{1*}$ of the first transaction buffer entry 501 was interrupted. The sub-step 730 is also denoted as rewriting step.

As described above, according to this embodiment of the invention it is assumed that a data value can not be considered as stable and its value can change over time.

In a following sub-step 740 it is evaluated whether the transaction recovery marker 505 is valid. The sub-step 740 is also denoted as transaction recovery marker checking step.

If this is the case, the transaction recovery continues with sub-step 750 and restores all transaction buffer entries 501 whose second valid marker $M_2$ is valid, in the persistent memory 150. During the sub-step 750 the first valid markers $M_1$ can be ignored.

The second valid marker $M_2$ is preferably defined as valid by any bit pattern not equal to a predefined bit pattern, in particular by any bit pattern not equal to a bit pattern of only zeros. The sub-step 750 is also denoted as main transaction recovery step.

In a following sub-step 760 the first valid marker $M_{1*}$ of the first transaction buffer entry 501* is written as invalid. In a following sub-step 770 the transaction recovery marker 505 is written as invalid. Then in sub-step 799 the transaction recovery step 700 has been completed.

If in sub-step 740 the transaction recovery marker 505 was evaluated as invalid, it is further evaluated in sub-step 775 if the first valid marker $M_{1\#}$ of the last transaction buffer entry 501# is valid. If this is the case it indicates that at least the second valid marker $M_{2\#}$ is not a weak-write. Then in sub-step 780 the transaction recovery marker 505 is written. According to this embodiment of the invention the transaction recovery marker is written at the end of the transaction buffer 500. This allows an easy finding of the transaction recovery marker 505. However, also other positions of the transaction recovery marker 505 could be used. After writing the transaction recovery marker 505 in sub-step 780 the transaction recovery step 700 continues with sub-step 750 as described above.

If the outcome of the evaluation in sub-step 775 is that the first valid marker $M_{1\#}$ of the last transaction buffer entry 501# is invalid, this indicates that the last transaction buffer entry 501# could be a weak write. Then the last the transaction recovery step 700 continues with a sub-step 785. In sub-step 785 the first valid marker $M_{1\#}$ of the last transaction buffer entry 501# is written as invalid. In sub-step 790 the second valid marker $M_{2\#}$ of the last transaction buffer entry 501# is written as invalid. Then in sub-step 795 the transaction recovery marker 505 is written and the method is continued with sub-step 750. If the second valid marker $M_{2\#}$ is read already as invalid, sub-step 785 can be omitted.

By means of the sub-steps 785 and 790 the last transaction buffer entry 501# that could be a weak write is clearly marked as invalid and it is avoided that it is recovered.

Figure 8:
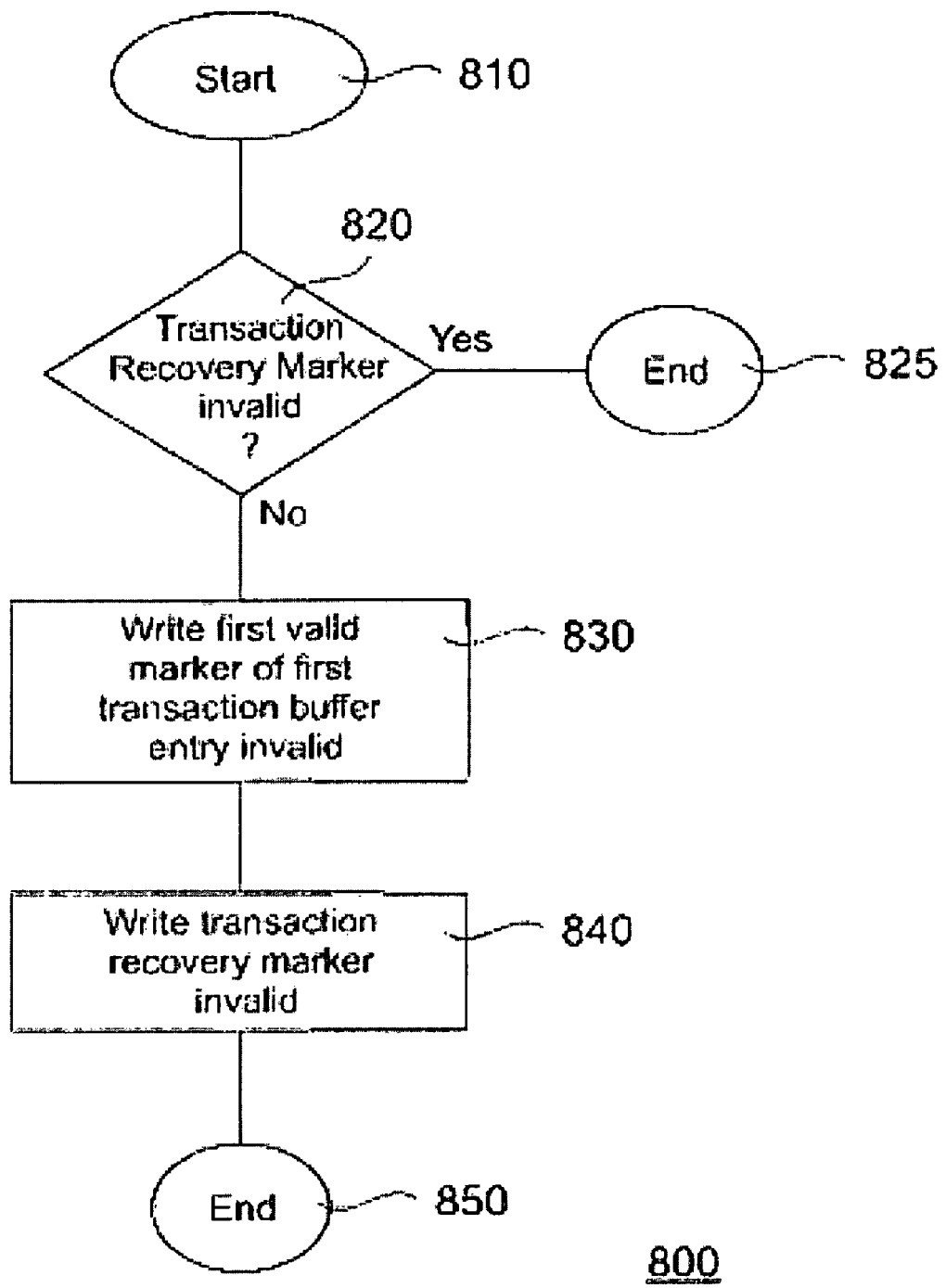
FIG. 8 shows a sub-routine of the transaction recovery step of FIG. 7.

FIG. 8 shows a sub-routine 800 of the transaction recovery step 700. The subroutine 800 is provided for checking if a previous transaction recovery could be finished correctly.

If in sub-step 720 the first valid marker $M_{1*}$ of the first transaction buffer entry 501* is not valid, the transaction recovery step 700 continues with a sub-step 810 which starts the subroutine 800. In a following sub-step 820 it is checked whether the transaction recovery marker 505 is invalid as well. If this is the case, the subroutine 800 stops in an ending sub-step 825. Actually this indicates that there was previously no aborted transaction recovery. If the result of sub-step 820 is that the transaction recovery marker 505 is valid, this indicates that the restoring sub-step 750 of the transaction recovery step 700 could be completed, but that the sub-steps 760 and/or 770 could not be completed. Hence in a following sub-step 830 the first valid marker $M_{1*}$ of the first transaction buffer entry 501* is written as invalid. In a following sub-step 840 the transaction recovery marker 505 is written as invalid. Then in sub-step 850 the transaction recovery step 700 has been completed.

Any disclosed embodiment may be combined with one or several of the other embodiments shown and/or described. This is also possible for one or more features of the embodiments.

ADDITIONAL EMBODIMENT DETAILS

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for transactional writing of data into a persistent memory comprising memory cells, the method comprising a transactional writing step and a transaction recovery step, wherein the transactional writing step comprises one or more memory cell writing steps, the memory cell writing steps comprising the sub-steps of:
- writing in a transaction buffer as transaction buffer entry the current data value and the corresponding address of the respective memory cell,
- writing a first valid marker for the memory cell in the transaction buffer, and
- writing a new data value to the memory cell; and wherein the transaction recovery step being performed in case of an abortion of the transactional writing step and being provided for restoring the current data values of the aborted transaction in the persistent memory, the transaction recovery step comprising the sub-step of:
- writing a transaction recovery marker to the transaction buffer indicating the start of the transaction recovery.

2. The method according to claim 1, wherein the transaction recovery marker is written behind the last valid entry of the transaction buffer and wherein the transaction recovery step comprises the sub-step of
- restoring all transaction buffer entries up to the transaction recovery marker in the memory device.

3. The method according to claim 1, wherein a valid transaction recovery marker is defined by a predefined bit pattern.

4. The method according to claim 1, wherein a valid transaction recovery marker is defined by any bit pattern not equal to a predefined bit pattern.

5. The method according to claim 1, wherein the first valid marker is defined by a predefined bit pattern.

6. The method according to claim 1, wherein the transactional writing step comprises writing a second valid marker before writing the first valid marker.

7. The method according to claim 6, wherein the second valid marker is defined by any bit pattern not equal to a predefined bit pattern.

8. The method according to claim 1, wherein the transaction recovery step comprises:
- a transaction buffer checking step for checking if the first valid marker of the first transaction buffer entry is valid; and, if the first valid marker of the first transaction buffer entry is valid,
- a transaction recovery marker checking step for checking if the transaction recovery marker is valid.

9. The method according to claim 8, wherein the transaction recovery step further comprises a rewriting step for rewriting the first valid marker of the first transaction buffer entry, the rewriting step being performed after the transaction buffer checking step if the first valid marker of the first transaction buffer entry is valid.

10. The method according to claim 8, wherein the transaction recovery step further comprises:
- if the transaction recovery marker is valid, performing a main transaction recovery step by means of recovering all transaction buffer entries whose second valid marker is valid,
- if the transaction recovery marker is invalid, further evaluating whether the first valid marker of the last transaction buffer entry is valid,
- if the first valid marker of the last transaction buffer entry is valid,
  - writing the transaction recovery marker and performing the main transaction recovery step;
- if the first valid marker of the last transaction buffer entry is invalid,
  - writing the corresponding first and/or second valid marker of this transaction buffer entry as invalid,
  - writing the transaction recovery marker and
  - performing the main transaction recovery step.

11. The method according to claim 1, further comprising the following steps being performed for completion of the transaction recovery step:
- invalidating the first valid marker of the first transaction buffer,
- invalidating the transaction recovery marker.

12. The method according to claim 8, further comprising the following steps if the first valid marker of the first transaction buffer entry is invalid:
- checking if the transaction recovery marker is valid, and, if the transaction recovery marker is invalid, performing the steps of
- invalidating the first valid marker of the first transaction buffer,
- invalidating the transaction recovery marker.

13. A memory system comprising a persistent memory and a persistent transaction buffer, wherein the memory system is provided for transactional writing of data values into the persistent memory, wherein the memory system is provided for performing a transactional writing step and a transaction recovery step, said system comprising:
- a transactional writing component for performing one or more memory cell writing steps, the memory cell writing steps comprising the sub-steps of:
  - writing in a transaction buffer as transaction buffer entry the current data value and the corresponding address of the respective memory cell,
  - writing a first valid marker for the memory cell in the transaction buffer, and
  - writing a new data value to the memory cell, and
- a transaction recovery component for performing a transaction recovery step, in case of an abortion of the transactional writing step, for restoring the current data values of the aborted transaction in the persistent memory, the transaction recovery step comprising the sub-step of
  - writing a transaction recovery marker to the transaction buffer indicating the start of the transaction recovery.

14. The memory system according to claim 13, wherein the memory system is a smart card.

15. A computer program stored on a non-transitory storage medium for transactional writing of data into a memory device, comprising instructions for carrying out the steps of the method comprising a transactional writing step and a transaction recovery step, wherein
the transactional writing step comprises one or more memory cell writing steps, the memory cell writing steps comprising the sub-steps of:
- writing in a transaction buffer as transaction buffer entry the current data value and the corresponding address of the respective memory cell,
- writing a first valid marker for the memory cell in the transaction buffer, and
- writing a new data value to the memory cell; and the transaction recovery step being performed in case of an abortion of the transactional writing step and being provided for restoring the current data values of the aborted transaction in the persistent memory, the transaction recovery step comprising the sub-step of:
- writing a transaction recovery marker to the transaction buffer indicating the start of the transaction recovery.

* * * * *